Dec. 2, 1947.  C. M. SAVRDA  2,431,893
FISH FILLETING MACHINE
Filed Aug. 22, 1944  8 Sheets-Sheet 1

INVENTOR.
CHARLES M. SAVRDA
BY Wm. S. Pritchard
ATTORNEY.

Dec. 2, 1947.                C. M. SAVRDA                2,431,893
                         FISH FILLETING MACHINE
                         Filed Aug. 22, 1944          8 Sheets-Sheet 4

INVENTOR.
CHARLES M. SAVRDA
BY
Wm. S. Pritchard
ATTORNEY.

Dec. 2, 1947.     C. M. SAVRDA     2,431,893
FISH FILLETING MACHINE
Filed Aug. 22, 1944     8 Sheets-Sheet 7

INVENTOR.
CHARLES M. SAVRDA
BY
ATTORNEY.

Patented Dec. 2, 1947

2,431,893

UNITED STATES PATENT OFFICE 2,431,893

FISH FILLETING MACHINE

Charles M. Savrda, Bay Shore, N. Y., assignor to The Atlantic Coast Fisheries Company, New York, N. Y., a corporation of Maine Application August 22, 1944, Serial No. 550,500

18 Claims. (Cl. 17—4)

This invention relates to a fish treating machine and more particularly to fish filleting machines.

United States Patent 2,149,021 discloses a fish filleting machine wherein a fish, tail leading and back downward, is first cut inwardly along its back throughout its length and almost to the backbone, and thereafter passed to the zone of action of a pair of circular belly-slitting knives which slit the belly side of the fish. During the latter operation, the fish is supported upon a pair of rotating guide discs. The guide discs and the circular belly-slitting knives are rotated at high peripheral speeds. When the fish leaves the zone of action of the belly-slitting knives, each fillet remains attached to the ribs of the fish and also to the backbone of the fish by ribbons of flesh between the cuts from the back and belly sides. Due to the rotation of the belly-slitting knives and the supporting guide discs, the fish is projected on to a pair of spaced rigid ribbing knives which sever the fillets from the backbone and the ribs. A ribbing conveyer serves to feed the fish over the ribbing knives.

The ribbing knives disclosed in the aforementioned patent comprise a pair of severing and ribbing blades which are arranged in spaced parallel relationship with each other to define a slit between which the backbone of the fish extends. The forward portions of the blades form severing knife portions and are merely flat with sharpened upper edges. These knife portions sever flesh from the sides of the backbone and connect the back and belly incisions or slices, so that the fillet is free from the bones of the fish except for its connection to the ribs thereof. Rearwardly of the severing portions, the blades form rib-scraping knife portions which are in the form of sharpened edges at the upper edges of the blades. Along these portions of the blades, their upper margins diverge upwardly. Further rearwardly, the blades turn horizontally outwardly, forming shelf-like portions which are likewise sharpened along their edges. Spaced outwardly and beginning at their forward ends somewhat above the shelf-like portions of the blades is a pair of retainer shields which hold the fillet down and thereby purport to retain the extremities of the ribs in proper relation with the edges of the blades. At the rear extremity of the blades is a pair of circular knives which act to sever any remaining connection that may exist between the fillets and the central or bone part of the fish.

United States Patent 2,179,821 discloses ribbing knives which are capable of use in the machine shown in United States Patent 2,149,021. The ribbing knives shown in Patent 2,179,821 comprise a pair of spaced knives provided at the top with sharp cutting edges. The forward extremities of the cutting edges are straight and substantially horizontal. Rearwardly of the forward extremities of the knives, the cutting edges merge into longitudinally curved cutting edges. Thus, from the forward extremities to the rear extremities, the cutting edges are continuous and comprise initially straight portions merging in longitudinally curved portions. Additionally, these knives diverge outwardly from the forward extremities to the rear thereof.

Though the fish filleting apparatus, including the ribbing knives, disclosed in Patent 2,149,021 and 2,179,821 constitutes an advance in the art, nevertheless a considerable amount of flesh remains attached to the skeleton, with the result that a considerable part of the edible fish flesh is lost.

An object of this invention is to provide a new and improved fish filleting apparatus.

Another object of this invention is to provide a fish filleting apparatus which will give maximum recovery.

A further object of this invention is to provide means for maintaining the fish in proper position on the ribbing knives as the fish is fed thereover to insure maximum recovery.

A still further object of this invention is to provide means for preventing the fillet from swinging out as it is being formed.

A still further object of this invention is to provide an adjustable means which controls the amount of nape which is to be included on or removed from the fillets.

Other and additional objects will become apparent hereinafter.

Herein the expression "nape" is used in the same manner as it is used in the art to designate the fleshy wall of the belly cavity.

The objects of this invention are accomplished, in general, by providing hold-down means which, as the fish is fed over the ribbing knives, first enters into the incisions in the belly side of the fish and then engage the fish on the ribs extending from both sides of the backbone and exert sufficient pressure to maintain the fish in contact with the ribbing knives to permit the scraping action but insufficient to cause the knives to cut through the ribs. The hold-down means also serves to prevent the fish and the fillet from moving inwardly and downwardly between the knives. Due to the fact that the ribbing knives are parallel at their forward ends and then gradually diverge upwardly and rearwardly, the hold-down means is formed in three sections. Each of the three sections of the hold-down means is made independently yieldable so that each can perform its intended function as the ribs of the fish increase in size. The first section is pivotally mounted under tension on a swivel whereby it can be raised by and accommodate itself to the increase in size of the backbone. The second section of the hold-down means is also pivotally mounted whereby it can be raised by and accommodate itself to the increase in size of the ribs of the fish passing therebeneath. The third section of the hold-down means is tension-mounted and controlled by fillet guides, hereafter described, to accommodate the increased size of the ribs passing therebeneath. The three sections are all interrelated, as will become apparent from the description hereinafter. It is to be understood that each section comprises two oppositely disposed and downwardly converging members, each mounted and functioning in the identical manner.

As the fillet is cut from the fish, it increases in thickness as the fish is fed over the ribbing knives. The fillets, during the course of their production, have a tendency to swing outwardly. The instant invention provides a pair of fillet guides, one on each side of the machine, which prevent the respective fillets engaged thereby from swinging outwardly. The fillet guides are positioned opposite to the third section of the hold-down means and are mounted so that they will yield in a lateral direction to accommodate increased thickness of the fillet and simultaneously actuate and control the movement of said third section.

At the rear end, each member of the third section of the hold-down means is provided with an adjustable nape control which serves to guide and position the nape into proper position for final cut-off. Upon adjustment of the nape control, the entire nape or any part thereof can be removed.

The specific details of the invention will now be described with reference to the drawings which show an illustrative embodiment of the invention and form a part of this specification, and wherein.

Figures 1, 3, 7, 8:
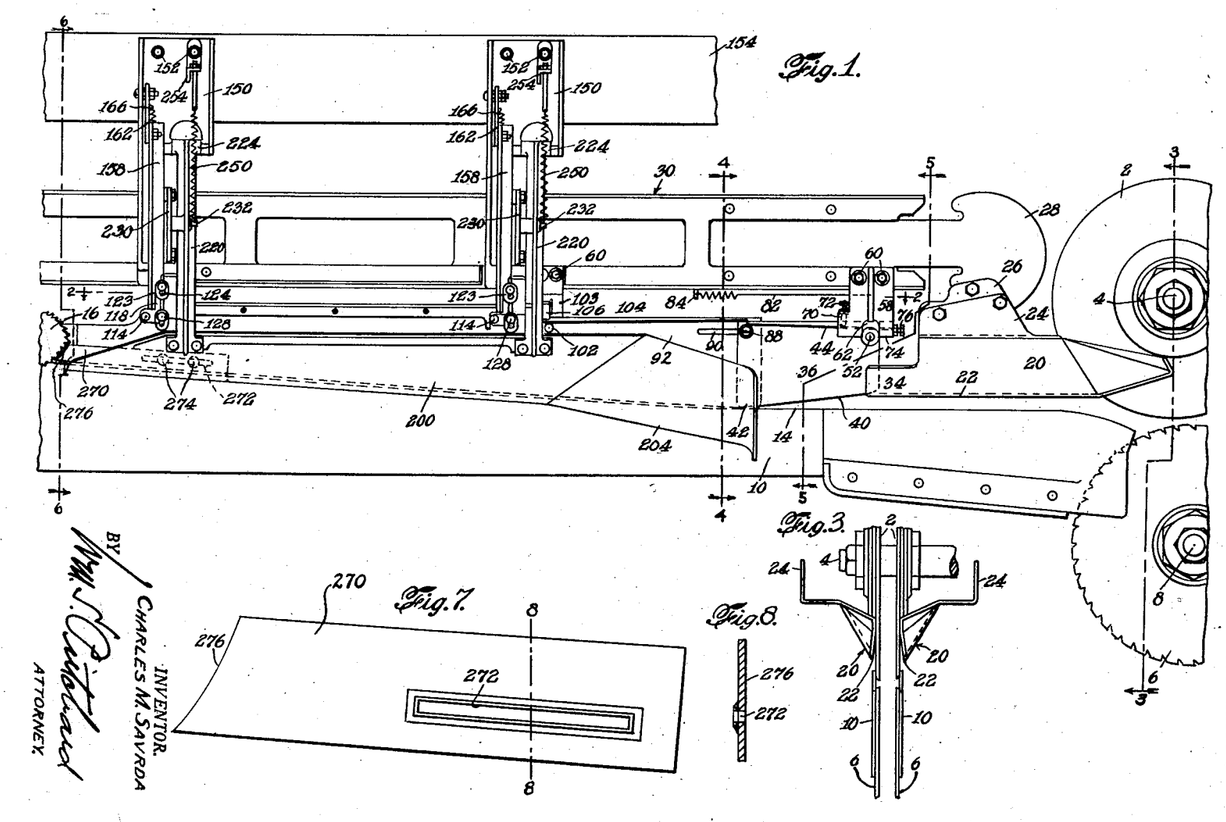
Figure 1 is a side elevation, partly broken away, of the invention.
Figure 3 is a section taken on the line 3—3 of Figure 1.
Figure 7 is a side elevation of the nape control.
Figure 8 is a section taken on the line 8—8 of Figure 7.

Referring now to the drawings, wherein like reference characters designate like parts, and particularly to Figure 1, the reference numeral 2 designates a pair of parallel circular belly-slitting knives mounted on a single shaft 4 carried in a suitable bearing mounted on the frame of the machine (not shown). Below the belly knives 2, there is a pair of circular guide discs 6 mounted on a single shaft 8 carried in a suitable bearing mounted on the frame of the machine (not shown). The guide discs 6 are designed to enter the slit in the back of the fish, made by apparatus not a part of this invention, and engage the backbone to support the fish during the belly-slitting operation. The belly-slitting knives 2 and the guide discs 6 are driven by suitable means (not shown) at high peripheral speeds. When the fish leave the zone of action of the belly knives 2, the fillets are still partly attached to the backbone by ribbons of flesh between the exposed extremities of the back and belly cuts and also to the ribs.

The aforementioned belly-slitting knives 2 and the circular supporting discs 6 are of the general type shown in United States Patent 2,149,021, or in copending application Serial No. 534,708, and since the specific details of construction thereof form no part of this invention, further description thereof is deemed unnecessary.

The fish is fed through the zone of action of the belly knives 2 at a high rate of speed and is projected onto a pair of ribbing knives, generally indicated by the reference numeral 10. A ribbing conveyer, of the type shown in United States Patent 2,149,021 or in United States Patent 2,397,158, aids to feed the fish across the ribbing knives. In the form shown in Figure 6, the ribbing conveyer is provided with a pair of oppositely disposed pusher fingers 12 of the type and construction shown in United States Patent 2,397,158.

Since the specific details of construction of the aforementioned ribbing conveyer and pusher fingers carried thereby form no part of this invention, further description thereof is deemed unnecessary. A full and complete description of the preferred ribbing conveyer and pusher fingers is given in United States Patent 2,397,158.

Each of the ribbing knives 10, appropriately mounted in the machine (not shown), comprises a pair of spaced knives having cutting edges 14 at the top thereof. As shown in Figures 16-19 inclusive, the ribbing knives 10 are, in general, straight (vertically disposed) and substantially parallel at the forward portion, and thereafter the knives 10 gradually diverge outwardly and upwardly, from the forward extremities, to the rear ends thereof. Ribbing knives of the type shown in United States Patent 2,400,118 and application Serial No. 534,875 may be used.

As shown in Figures 1, 2a, 18 and 19, a circular cut-off knife 16 is provided adjacent the exit end of each knife 10. Each knife 16 is disposed at an angle substantially the same as that of the knife 10 adjacent thereto and is driven through the shaft 17 by a motor 18.

As shown in Figure 1, disposed at the exit side of the belly-slitting knives 2 are a pair of spaced oppositely disposed deflectors 20. These deflectors are positioned so that the bottom edges 22 thereof enter in the incisions made by the belly-slitting knives 2 as the fish leaves the zone of action of said knives and urge the fish onto the ribbing knives 10. Each of the deflectors 20 is bent into the form shown in Figure 3 and is provided with an integral bracket 24 which is secured, as shown in Figure 1, onto a support 26. The support 26 is mounted on the head 28 carried between the frame members 30 and around which the ribbing conveyer (not shown) passes.

As is shown in Figure 1, the forward portion of each deflector 20 overlaps on the belly-slitting knife 2 adjacent thereto, and at the rear each deflector 20 is provided with an extension 34 which overlaps onto the exterior surface of the first section of the hold-down means.

Figure 2:
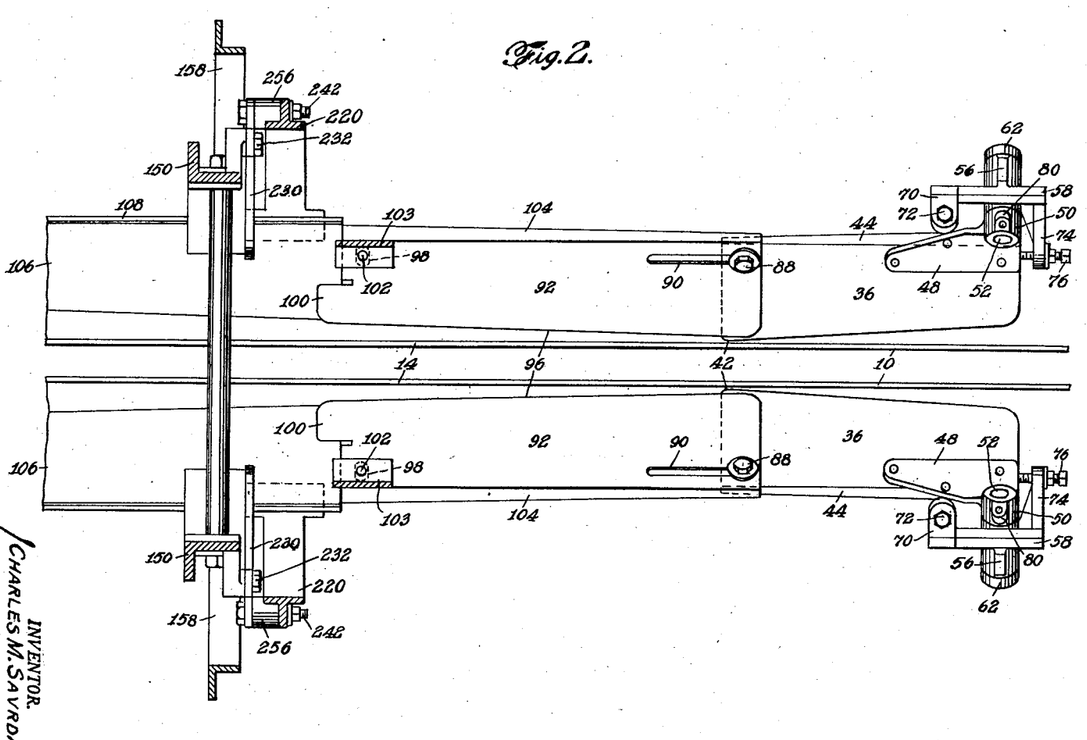
Figures 2 and 2a are a section taken on the line 2—2 of Figure 1.
Figure 2A:
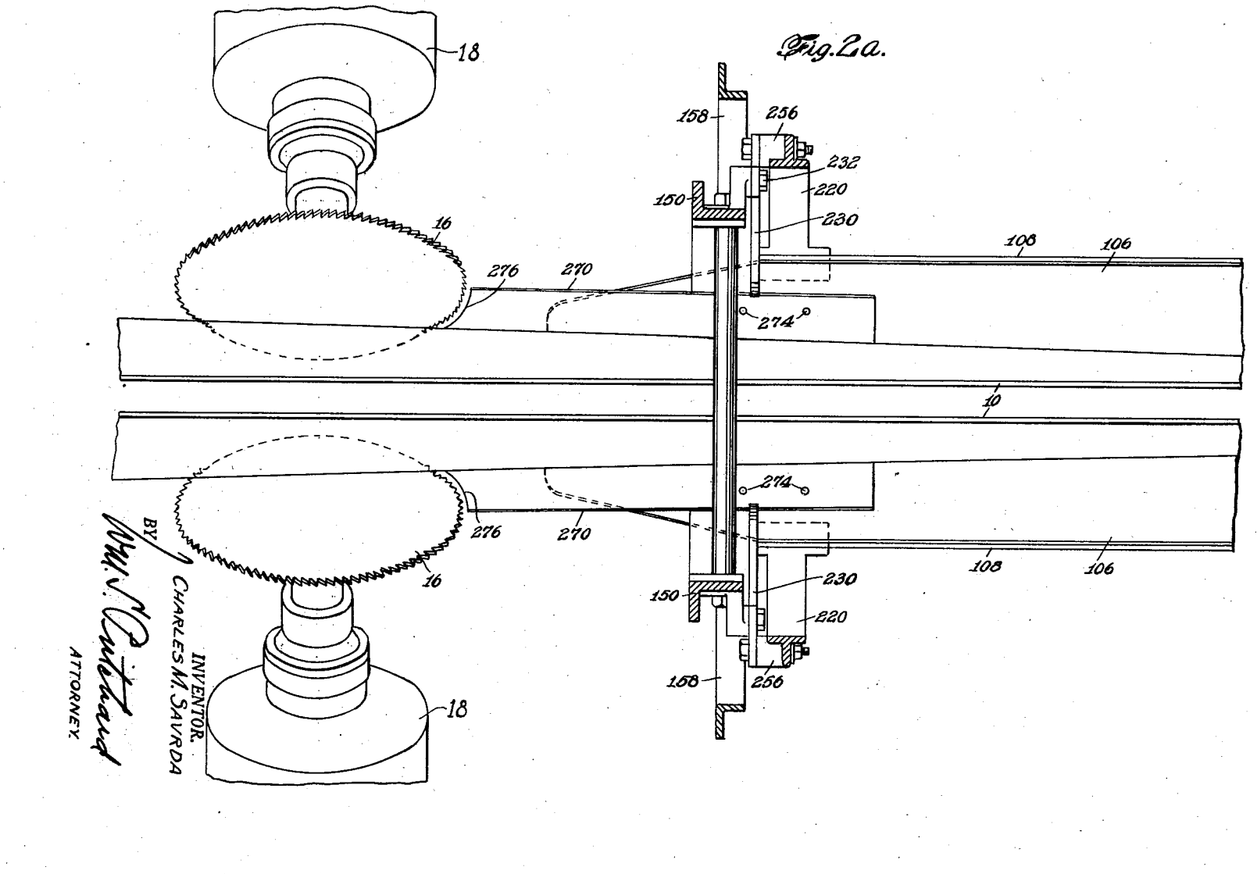
Figure 4:
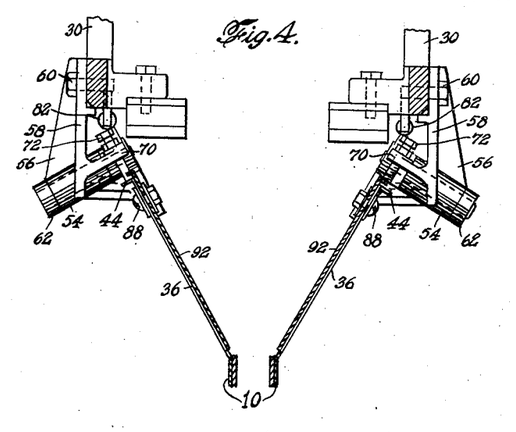
Figure 4 is a section taken on the line 4—4 of Figure 1.
Figure 5:
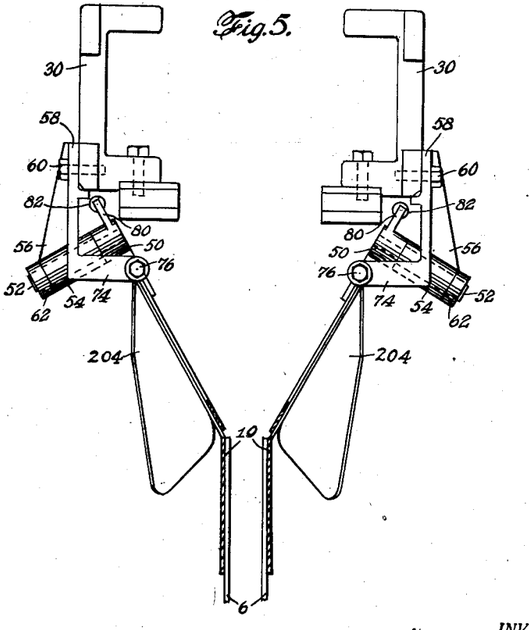
Figure 5 is a section taken on the line 5—5 of Figure 1.
Figure 9:
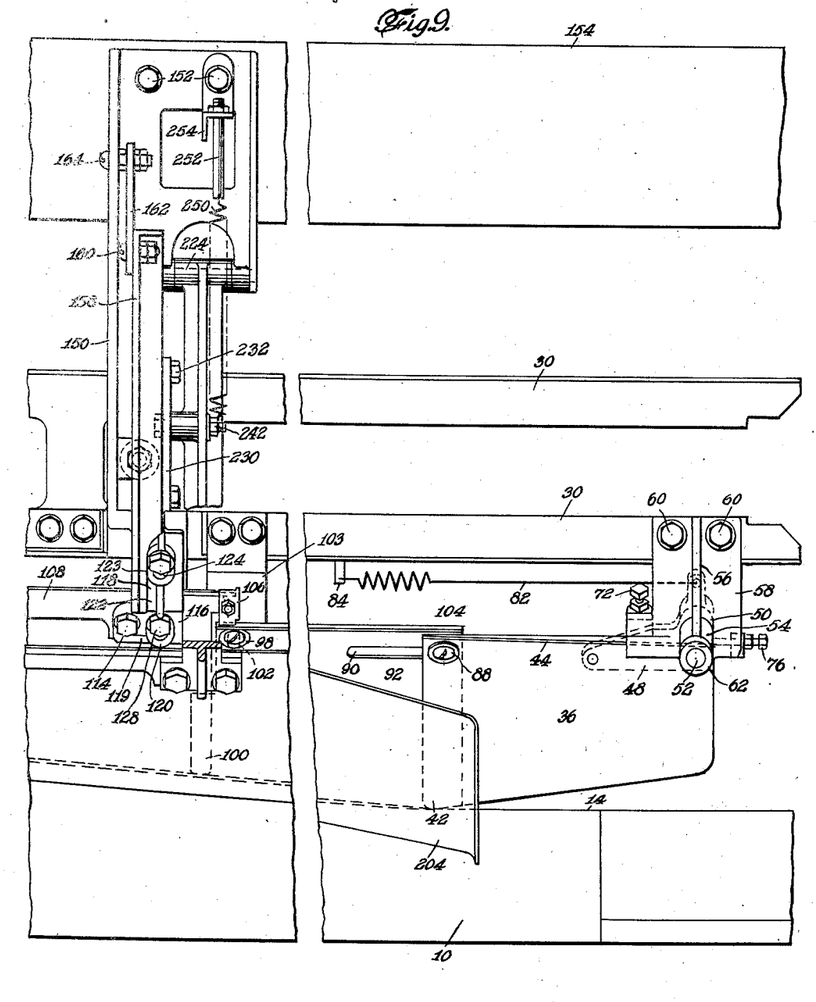
Figure 9 is a side elevation, partly broken away, to show certain details of construction more clearly.
Figure 10:
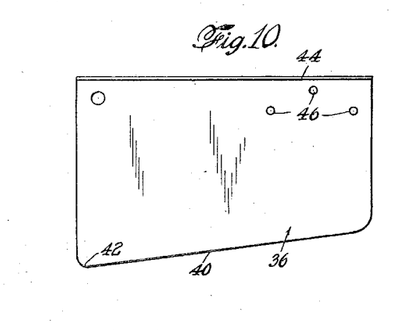
Figure 10 is a side elevation of the left member of the first section of the hold-down means.
Figure 11:
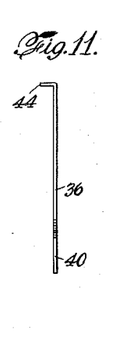
Figure 11 is an end view of the hold-down member shown in Figure 10.

The first section of the hold-down means comprises two oppositely disposed members 36. Since the details of construction of and the manner in which both members are mounted are identical, only one of such members and the manner in which it is mounted will be described. As shown in Figures 10 and 11, each member 36 comprises a plate, the lower edge 40 of which is inclined downwardly from the front to the rear thereof and terminates in a rounded corner 42. For reasons which will become apparent, each plate 36 of the hold-down means is provided with an outwardly extending flange 44 at the top edge thereof. The flange 44 tapers inwardly from the front toward the rear thereof. Each plate 36 is mounted at an angle with the bottom edge thereof in alignment with the knife 10 disposed therebeneath, and the corner 42 normally rests on the knife. With this in view, each plate 36 of the first hold-down section, as shown in Figures 2, 4, 5 and 9, is secured to a holder 48. The holder 48 is provided with a boss 50 which is secured onto a shaft 52 carried in an inclined journal 54. As shown in Figures 4, 5 and 9, the journal 54 is formed at the end of a rib 56 on a bracket 58. The vertical member of the bracket 58 is secured by bolts 60 to the frame 30. A collar 62 on each end of the shaft 52 positions it in place. As shown in Figures 1, 2 and 9, at its lower end, each bracket 58 is provided with a lug 70 in which there is positioned an adjustable stop screw 72 which is adapted to cooperate with the flange 44 of the plate 36. Each bracket 58 is also provided with a horizontal arm 74 in which a stop screw 76 is adjustably positioned. The stop screw 76 is designed to cooperate with the forward edge of the holder 48 and limit its movement. Lock nuts are used to secure the screws 72 and 76 in adjusted position.

A spring 82 (see Figures 1 and 9), having one end secured to an arm 80 extending from the boss 50 of the holder 48 and the other end secured to a pin 84 carried by the frame 30, normally urges the plate 36 to rotate about the shaft 52 in a direction whereby the rear corner 42 of the plate 36 is urged downwardly into contact or almost in contact with the ribbing knife. The stop screw 76 limits the movement of the plate in the downward direction. The stop screw 72 limits the movement of the plate about the pivot in an upward direction, as will be hereafter explained.

As shown in Figures 1, 2 and 9, at its rear end and adjacent the top thereof, each plate 36 is provided with a screw 88 which cooperates with a horizontal slot 90 provided adjacent the top forward portion of the second hold-down member next adjacent thereto. It is to be noted that the rear portion of each of the first hold-down members 36 overlaps onto the exterior surface of the respective second hold-down member at the forward end thereof.

As shown in Figures 2 and 4, the second hold-down member comprises a pair of oppositely disposed plates 92. Since the details of construction and the manner of positioning the same in the machine are the same, only one of such plates and the manner in which it is mounted will be described. As will be seen in Figures 2, 4 and 12, the lower edge 96 of each plate 92 is inclined upwardly from the front to the rear and at an angle substantially the same as the angle of inclination of the knife therebeneath. Adjacent the rear thereof, each plate 92 is provided with a vertical slot 98 and at its rear lower end is provided with an extension 100. A screw 102 carried by a bracket 103 appropriately mounted in the machine cooperates with the slot 98. Due to this construction, each plate 92 of the second section of the hold-down means is movable about the screw 88 as a pivot and also is movable about the screw 102 as a pivot.

The portion of the bracket 103 which carries the screw 102 is offset to the body thereof and disposed at an angle (see Figures 1, 2 and 9). Because of this construction and the inclination of the plate 36 of the first hold-down section, each plate 92 is also angularly disposed.

Figures 12, 13:
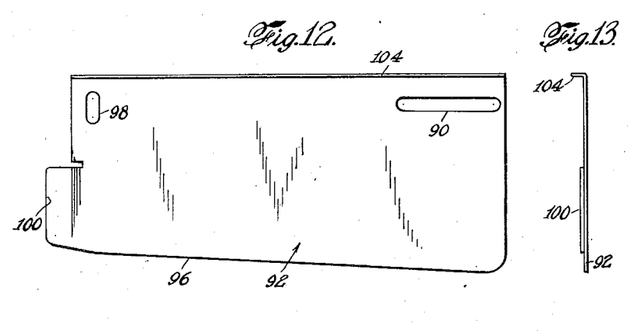
Figure 12 is a side elevation of the left member of the second section of the hold-down means.
Figure 13 is an end view of the hold-down member shown in Figure 12.

The upper edge of each plate 92 is provided with a flange 104 which at its forward end overlaps onto the flange 44 of the plate 36 in front thereof (see Figures 2 and 13). A stop 106 (see Figures 1 and 9) cooperating with the flange 104 adjacent its rear end limits the movement of the plate 92. Each plate 92, as previously mentioned, is provided with an extension 100 adjacent the bottom thereof and which overlaps on the interior surface of the member 110 of the third hold-down section.

Figures 14, 15:
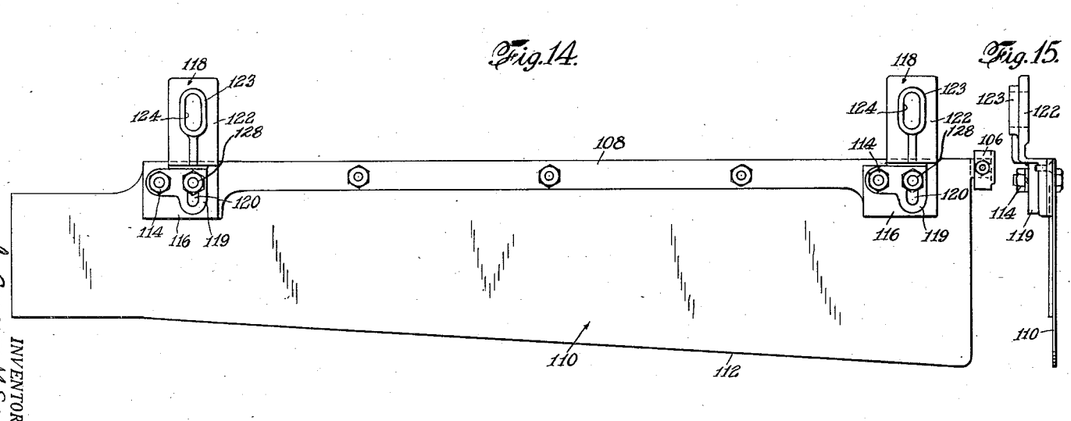
Figure 14 is a side elevation of the left member of the third section of the hold-down means together with the supporting means.
Figure 15 is an end view of the hold-down member shown in Figure 14.

The stop 106, as shown in Figures 14 and 15, is secured to a brace 108 on which the plate 110 constituting one member of the third section of the hold-down means is secured. The lower edge 112 of the plate 110 inclines upwardly from the front to the rear thereof corresponding to the angle of inclination of the ribbing knives. Adjacent each end of each brace 108, there is secured by means of screws 114 a base 116 of a slide block 118. Each base 116 is provided with a boss 119 having a longitudinal slot 120 for reasons which will become apparent. Offset to and extending from the top of the base 116 is a slide 122, also provided with a boss 123 having a longitudinal slot 124 therein. As clearly shown in Figure 6, the base 116 of the slide block 118 is positioned on a stationary guide support 126. A screw 128 passing through the slot 120 of the base 116 of the of the slide block 118 slidably secures the slide block on the stationary support 126. The slide 122 is also disposed on the stationary support 126 at 132. A screw 134 passing through the slot 124 secures the slide 122 to the support at 132. It is clear that by this arrangement each slide block is slidable on its respective support. The stationary support 126 is carried at the lower end of a guide support 150, which is secured by means of screws 152 to a frame member 154 of the machine.

An arm 158 is secured at one end, as by soldering, to the slide 122. The other end is secured at 160 to one end of an arm 162. The other end of the arm 162 is pivoted at 164 on the guide support 150. It is apparent that when the third section of the hold-down means is elevated, the slide will be caused to move upwardly whereby the movement of the arm 158 will be transmitted to the arm 162 which will move about its pivot 164. A spring 166 has one end secured to the arm 162 as at 170 and the other end secured in a hole 172 in the arm 158. The slot 124 limits the (gravitational) downward movement of the plate whereby the lower edge of the plate 110 is in spaced relationship to the knife.

Figure 6:
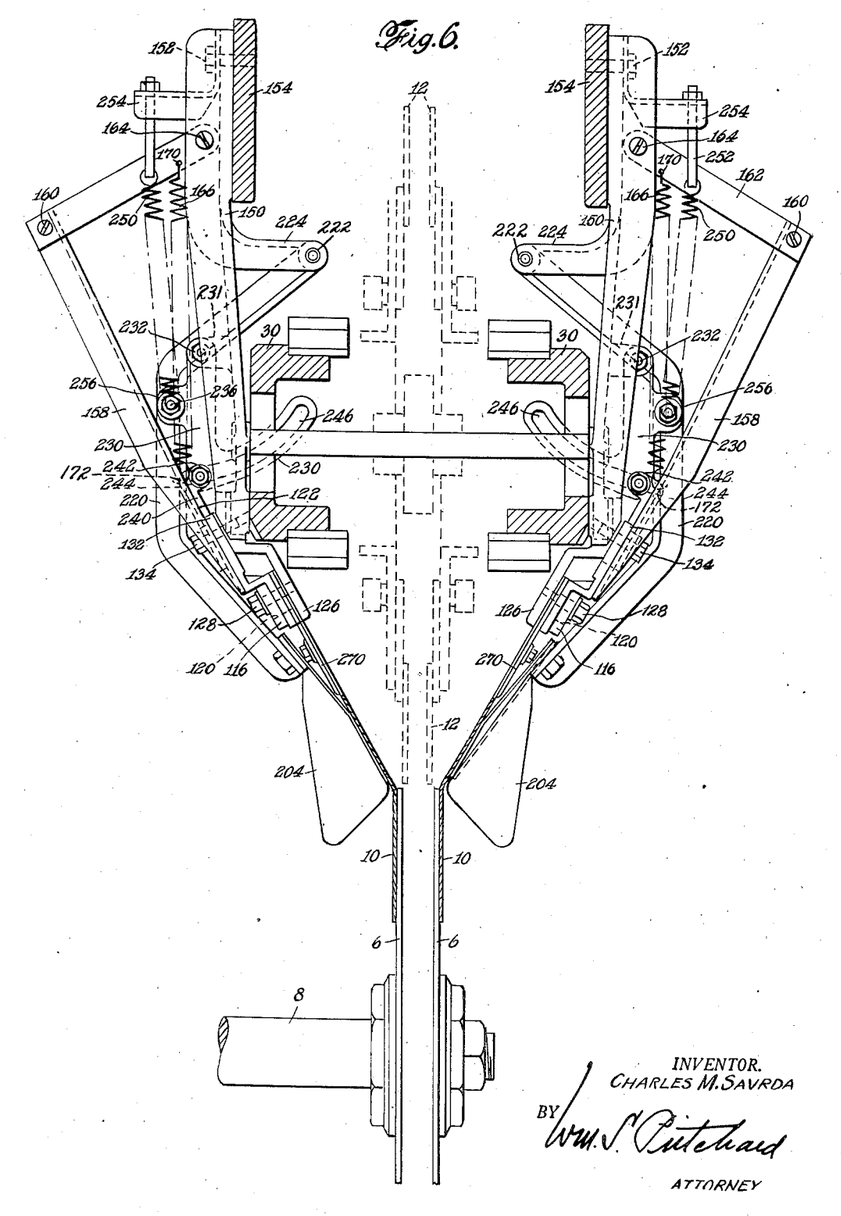
Figure 6 is a section taken on the line 6—6 of Figure 1.

As is shown in Figure 1, there is provided a pair of fillet guides 200, each of which extends on opposite sides of the machine from approximately the discharge end of the first hold-down means to a distance in front of the cut-off knives 16. The feed end of each fillet guide 200 is flared outwardly, as indicated by the reference numeral 204, whereby the flesh of the fillet is gradually introduced between the fillet guide 200 and the exterior wall of the knife 10 and the hold-down members opposite thereto. Referring now to Figure 6, each fillet guide 200 is secured to a spaced pair of arms 220. Each arm 220 is of the form shown in Figure 6 and at the top end thereof is pivotally mounted on a stud 222 carried in an arm 224 extending from the guide support 150. A cam lever 230 is pivotally mounted at 232 on an ear 231 carried by the support 150. A screw 236 adjustably secures the cam lever 230 to the arm 220. It is apparent that when the arm 220 moves outwardly, the cam lever 230 will likewise move outwardly. In order to control the movement of the members of the third section of the hold-down means by the fillet guide opposite thereto, the slide 122 is provided with an arm 240 which carries a boss 242 in which there is mounted a cam roller 244 which cooperates with a cam slot 246 of the cam lever 230. The cam slot 246 is of such contour that for a portion of the relative movement between it and the cam roller 244, the arm 220 will be moved outwardly and thereafter, even though there is further relative movement between the cam slot 246 and the cam roller 244, the arm 220 will not move outwardly. In other words, in the latter portion of the operation of the cam just described, the cam slot 246 is of a constant radius. A spring 250 has one end secured to a pin 252 carried in a lug 254. The other end of the spring 250 is secured to the arm 220, as at 256, whereby the arm 220 is tension-mounted.

As previously mentioned, the members 110 of the third section of the hold-down means and the fillet guides 200 opposite thereto terminate in advance of the cut-off knives 16, the distance therebetween being such that the entire nape of the fillet will be pulled inwardly between and removed by the knives 10 and the knives 16. The removal of the entire nape results in a considerable loss of fish. Accordingly, this invention includes means whereby predetermined portions of the nape can be removed. With this in view, there are provided nape control guides 270. One of said nape control guides 270 is adjustably secured to each of the members 110 of the third hold-down section. As shown in Figures 1, 7 and 8, each nape control guide comprises a plate having a slot 272. Screws 274 extending through the slot adjustably secure the nape control guide to the respective member of the third hold-down section. The bottom edge of each nape control guide is inclined upwardly from the front to the rear thereof and is of the same angularity as the angularity of the bottom edge of the respective member 110 to which it is secured. The rear edge 276 is curved and of a radius substantially equal to that of the knives. By adjustably moving the nape control guide relative to the cutoff knives, the quantity of the nape which may be severed from the fillet can be controlled.

From the foregoing description, it is apparent that the hold-down means comprises three sections, and each of the three sections comprises two members identical in construction, and each is mounted similarly in the machine. As is apparent, the respective members of each section are oppositely disposed and are mounted so that they form a passage converging downwardly between which the pusher fingers of the feed conveyer travel.

As is also apparent from the description, there are two fillet guides 200, each of which is pivotally mounted, as herein described, and capable of being moved outwardly to accommodate an increased thickness of the fillet and thereby actuate the members of the third hold-down section.

Figure 16:
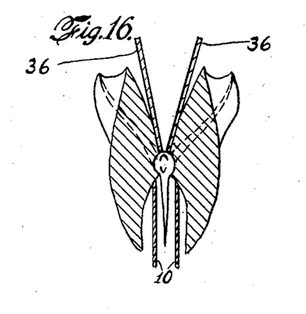
Figures 16, 17, 18 and 19 are diagrammatic cross-sectional views showing the relation of parts at different stages of the filleting operation.
Figure 17:
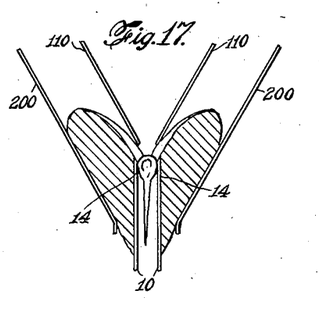
Figure 18:
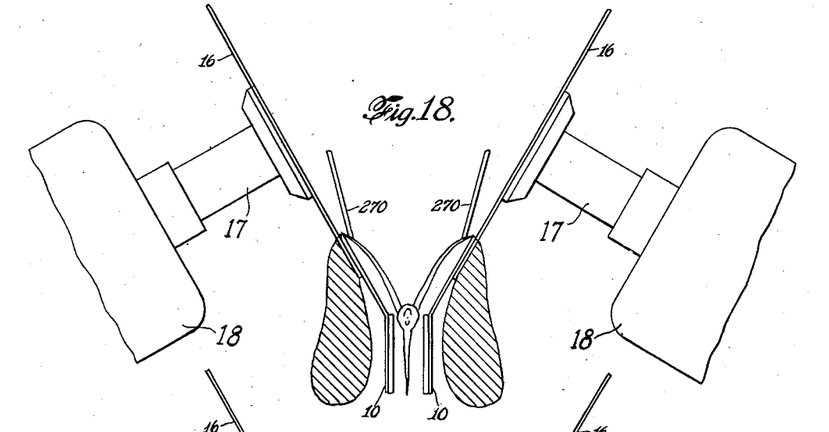
Figure 19:
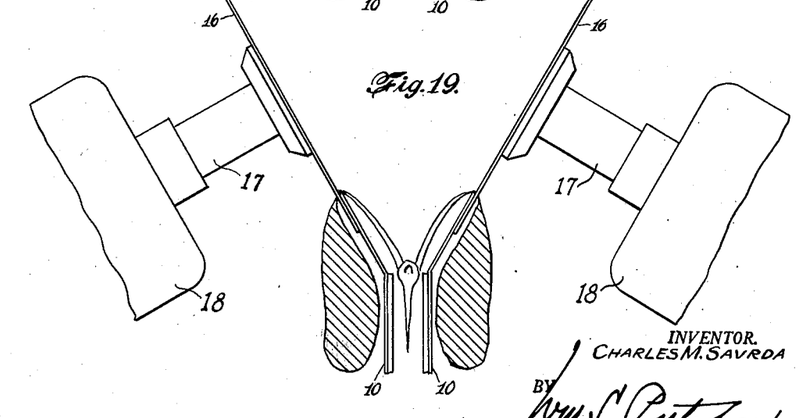

The mode of operation will become more apparent upon reference to Figures 16-19 inclusive, which diagrammatically show the fish and the position of the knives, the hold-down means, the fillet guides, etc. Referring now to Figure 16, this figure shows the relation of parts while the fish is in engagement with the first section of the hold-down means. It will be noted that the hold-down means 36 engages the backbone on the opposite sides thereof and that the knives 10 have begun to cut the fillets away from the backbone. Figure 17 shows the relation of parts as the fish is passing under the third section of the hold-down means. It will be noted that the hold-down means 110 engages the ribs of the fish and the knife 10 is separating the fillet from the ribs. The fillet guides 200, it will be noted, support the portion of the fillet which has been severed. Figure 18 shows the fish just prior to the severing by the cut-off knives. It will be noted that the nape control guide 270 is in engagement with the ribs of the fish and prevents the fillet from moving over the knives and down therebetween. Figure 19 diagrammatically shows the severance of the fillet.

It is to be noted from the foregoing that the hold-down members, and particularly those of the third section, are designed to engage the ribs of the fish and prevent the fillet from turning down into and between the knives. The hold-down members of the second hold-down section may also function similarly. The hold-down members of the first section however, it is to be noted, may engage the backbone on opposite sides thereof. The foregoing conditions exist when a relatively large fish is being filleted. However, when a small fish is being filleted, it is apparent that the hold-down members will engage the ribs and that the filleting operation will be completed before the fish has been fed to the cut-off knives.

In operation, a fish, tail leading and back downward and from which the dorsal fin has been removed, is fed into the zone of action of the belly-slitting knives 2, the supporting discs 6 entering into the slit in the bottom of the fish and engaging the backbone. As the fish is being projected from the zone of action of the belly-slitting knives 2, the edges 22 of the deflector enter into the slit formed by said knives and urge the fish downwardly. At the same time the ribbing knives 10 enter into the incision in the back of the fish. The ribbing conveyer, and particularly the pusher fingers 12, engages the fish as described in copending application Serial No. 530,967 and feeds the fish across the ribbing knives. Since the extension 34 of the deflector 20 overlaps onto the first hold-down means 36, the first hold-down means will be introduced into the incisions in the belly side of the fish and, as the fish is propelled, the rear corner 42 of each of the hold-down members of the first hold-down means will engage each side of the backbone or in the vicinity thereof. The spring 82 normally urges the respective member of the first section downwardly. When the backbone is engaged by the rear corner of the plate 36, the plate 36 will move about the pivot shaft 52 whereby the corner 42 will be elevated in accordance with the size of the backbone. During this elevation, the second section which is connected to the first section will also be elevated at the forward end thereof, the second section pivoting on the screw 102. When the fish has passed through the first section the spring 82 will return it to original position. The front of the second section will likewise return to its original position and, while the fish is being engaged by the second section, the rear end thereof will be elevated, the screw 88 serving as the pivot. During passage of the fish through the second section, the fillet which has now been partly severed is guided by the flared end 204 of the fillet guide 200 so that it will be supported by the fillet guides and prevented from swinging outwardly. As the fish continues in its passage across the ribbing knives, and particularly when the fillet severed therefrom increases in thickness, the fillet guide 200 is caused to move outwardly, whereby the arm 220 is moved about its pivot 222. The outward movement of the arm 220 moves the cam lever 230 therewith, whereby, due to the cam roller 244, the slide 122 is caused to move upwardly, which movement is transmitted to the hold-down means. When the fish reaches the rear end of the third hold-down member, the nape control guides 270 serve to hold and position the fish to and on the ribbing knives 10 and the cut-off knives so that a fillet of maximum recovery is obtained.

Since it is obvious that various changes and modifications may be made in the above description without departing from the nature or spirit thereof, this invention is not restricted thereto except as set forth in the appended claims.

I claim:

1. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, yieldingly mounted hold-down means positioned above said ribbing knives to maintain the fish in contact with said ribbing knives and comprising a series of pairs of oppositely disposed downwardly converging plates with their respective bottom edges in substantial alignment with the cutting edge of the knife therebeneath.

2. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, hold-down means to maintain the fish in contact with said ribbing knives, said hold-down means comprising a series of pairs of oppositely disposed plates with their respective bottom edges in substantial alignment with the cutting edge of the knife therebeneath, and means to yieldingly mount each pair of said plates above said knives whereby each pair can yield independently of the other pairs.

3. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, hold-down means to maintain the fish in contact with said ribbing knives, said hold-down means comprising a pair of oppositely disposed downwardly converging plates, and means to yieldingly mount said plates above said knives with their respective bottom edges in substantial alignment with the cutting edge of the knife therebeneath and in position to enter the incision in the belly side of the fish whereby the fish will be engaged on opposite sides of the backbone.

4. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, hold-down means to maintain the fish in contact with said ribbing knives, said hold-down means comprising a pair of oppositely disposed downwardly converging plates positioned above said knives, each of said plates having its bottom edge in substantial alignment with the cutting edge of the knife therebeneath and inclined downwardly from the front to the rear thereof, and means to yieldingly mount each of said plates with the bottom edge at the rear thereof normally in contact with the knife disposed thereunder and in position to enter the incision in the belly side of the fish and engage it on opposite sides of the backbone.

5. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, hold-down means to maintain the fish in contact with said ribbing knives, said hold-down means comprising a pair of oppositely disposed downwardly converging plates positioned above said knives with the respective bottom edges in substantial alignment with the cutting edge of the knife therebeneath, and means to yieldingly mount each of said plates adjacent the front and rear thereof and suspend them in position to enter the incision in the belly side of the fish and engage it on opposite sides of the backbone.

6. In a fish filleting machine having a pair of oppositely disposed ribbing knives and means to feed thereover a fish having an incision in its belly side and with its tail leading and back downward, means positioned adjacent each of said knives and cooperating therewith to provide a passage to receive the fillet as it is being severed from the fish and prevent it from moving inwardly between said knives.

7. In a fish filleting machine having a pair of oppositely disposed ribbing knives and means to feed thereover a fish having an incision in its belly side and with its tail leading and back downward, a fillet guide positioned exteriorly of and adjacent each of said knives, and means to yieldingly mount each of said fillet guides to permit said guides to yield outwardly as the fillet passing between said knives and guides increases in thickness.

8. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, means to yieldingly mount each of said plates above said knives and suspend said plates in position to enter the incision in the belly side of the fish and engage it on opposite sides of the backbone, a fillet guide positioned exteriorly of and adjacent each of said knives and hold-down plates, means yieldingly mounting each of said fillet guides to permit said guides to yield outwardly as the fillet increases in thickness, and means actuated by movement of said fillet guide to raise and lower the hold-down plate opposite thereto.

9. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, a slide secured to each of said plates, means to slidably secure each of said slides on a respective support disposed above said knives and in position to suspend said plates to enter the incision in the belly side of the fish and engage it on opposite sides of the backbone, a fillet guide positioned exteriorly of and adjacent each of said knives and plates, means yieldingly mounting each of said fillet guides to permit said guides to yield outwardly as the fillet increases in thickness, and means actuated by movement of said guide to actuate said slide and thereby move the hold-down plate carried thereby.

10. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, a slide secured to each of said plates, means to slidably secure each of said slides on a respective support disposed above said knives and in position to suspend said plates to enter the incision in the belly side of the fish and engage it on opposite sides of the backbone, a fillet guide positioned exteriorly of and adjacent each of said knives and plates, means yieldingly mounting each of said fillet guides to permit said guides to yield outwardly as the fillet increases in thickness, and means actuated by movement of said guide to actuate said slide and thereby move the hold-down plate carried thereby a predetermined distance irrespective of the movement of said fillet guide.

11. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, a slide secured to each of said plates, means to slidably secure each of said slides on a respective support disposed above said knives and in position to suspend said plates to enter the incision in the belly side of the fish and engage it on opposite sides of the backbone, a fillet guide positioned exteriorly of and adjacent each of said knives and plates, means yieldingly mounting each of said fillet guides to permit said guides to yield outwardly as the fillet increases in thickness, and cam means actuated by movement of said guide to actuate said slide and thereby move the hold-down plate carried thereby.

12. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, a slide secured to each of said plates, means to slidably secure each of said slides on a respective support disposed above said knives and in position to suspend said plates to enter the incision in the belly side of the fish and engage it on opposite sides of the backbone, a fillet guide positioned exteriorly of and adjacent each of said knives and plates, means yieldingly mounting each of said fillet guides to permit said guides to yield outwardly as the fillet increases in thickness, and cam means actuated by movement of said guide to actuate said slide and thereby move the hold-down plate carried thereby a predetermined distance irrespective of the movement of said fillet guide.

13. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, a slide secured to each of said plates, means to slidably mount each of said slides on respective supports disposed above said knives and in position to suspend said plates to enter the incision in the belly side of the fish and engage it on opposite sides of the backbone, a cam roller carried by each of said slides, a fillet guide positioned exteriorly of and adjacent each of said knives, a pivotally mounted arm carrying said guide on one end thereof to permit said guide to yield outwardly as the fillet increases in thickness, and a cam lever mounted on said arm, said cam lever having a cam slot cooperating with said cam roller.

14. In a fish filleting machine having a pair of oppositely disposed ribbing knives and means to feed thereover a fish having an incision on its belly side and with its tail leading and back downward, hold-down means to maintain the fish in contact with said ribbing knives, said hold-down means comprising a pair of oppositely disposed plates, a slide secured to each of said plates, means to slidably mount each of said slides on respective supports disposed above said knives and in position to suspend said plates to enter the incision in the belly side of the fish and engage it on opposite sides of the backbone, a cam roller carried by each of said slides, a fillet guide positioned exteriorly of and adjacent each of said knives, a pivotally mounted arm carrying said guide on one end thereof to permit said guide to yield outwardly as the fillet increases in thickness, and a cam lever mounted on said arm, said cam lever having a cam slot cooperating with said cam roller, said cam slot having a constant radius for a substantial portion of its length.

15. In a fish filleting machine having a pair of oppositely disposed ribbing knives, means to feed thereover a fish having an incision on its belly side and with its tail leading and back downward and a cut-off knife at the exit end of each knife, hold-down means to maintain the fish in contact with said ribbing knives, said hold-down means comprising a pair of oppositely disposed plates, means to yieldingly mount each of said plates above said ribbing knives and suspend said plates in position to enter the incision in the belly side of the fish and engage it on opposite sides of the backbone, each of said plates terminating in advance of the respective cut-off knife whereby the nape will be severed from the fillet, and means adjustably mounted on each of said plates to control the amount of nape to be severed.

16. In a fish filleting machine having a pair of oppositely disposed ribbing knives, means to feed thereover a fish having an incision on its belly side and with its tail leading and back downward, and a cut-off knife at the exit end of each knife, hold-down means to maintain the fish in contact with said ribbing knives, said hold-down means comprising a pair of oppositely disposed plates, means to yieldingly mount each of said plates above said ribbing knives and suspend said plates in position to enter the incision in the belly side of the fish and engage it on opposite sides of the backbone, each of said plates terminating in advance of the respective knife whereby the nape will be severed from the fillet, an auxiliary plate mounted on each of said plates and constituting an extension thereof, and means to adjust the position of each of said auxiliary plates relative to the respective cut-off knife to control the amount of nape to be severed.

17. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, hold-down means to maintain the fish in contact with said ribbing knives, said hold-down means comprising a pair of oppositely disposed downwardly converging plates positioned above said knives with the respective bottom edges in substantial alignment with the cutting edge of the knife therebeneath, and means to yieldingly mount each of said plates adjacent the front and rear thereof and suspend them in position to enter the incision in the belly side of the fish and engage it on opposite sides of the backbone, the means for mounting each of said plates at the front thereof comprising an inclined swivel, means to limit the movement of the plate about its swivel, and means continuously urging the plate to move downwardly.

18. In a fish filleting machine having a pair of oppositely disposed ribbing knives, which are substantially parallel at the forward portion and thereafter gradually diverge outwardly and upwardly from said forward portion, and means to feed thereover a fish having an incision in its belly side and with its tail leading and back downward, hold-down means to maintain the fish in contact with said ribbing knives, said hold-down means comprising three sections, each section comprising a pair of oppositely disposed downwardly converging plates having their respective edges in substantial alignment with the cutting edge of the knife therebeneath, and means to mount each section independently yieldable.

CHARLES M. SAVRDA.

REFERENCES CITED

The following references are of record in the file of this patent:

UNITED STATES PATENTS

| Number | Name | Date |
| --- | --- | --- |
| 2,149,021 | Hunt | Feb. 28, 1939 |
| 1,709,362 | Meissner et al. | Apr. 16, 1929 |